March 27, 1951     W. P. DALRYMPLE     2,546,887
LUBRICATING SYSTEM
Filed Jan. 19, 1946     2 Sheets-Sheet 1
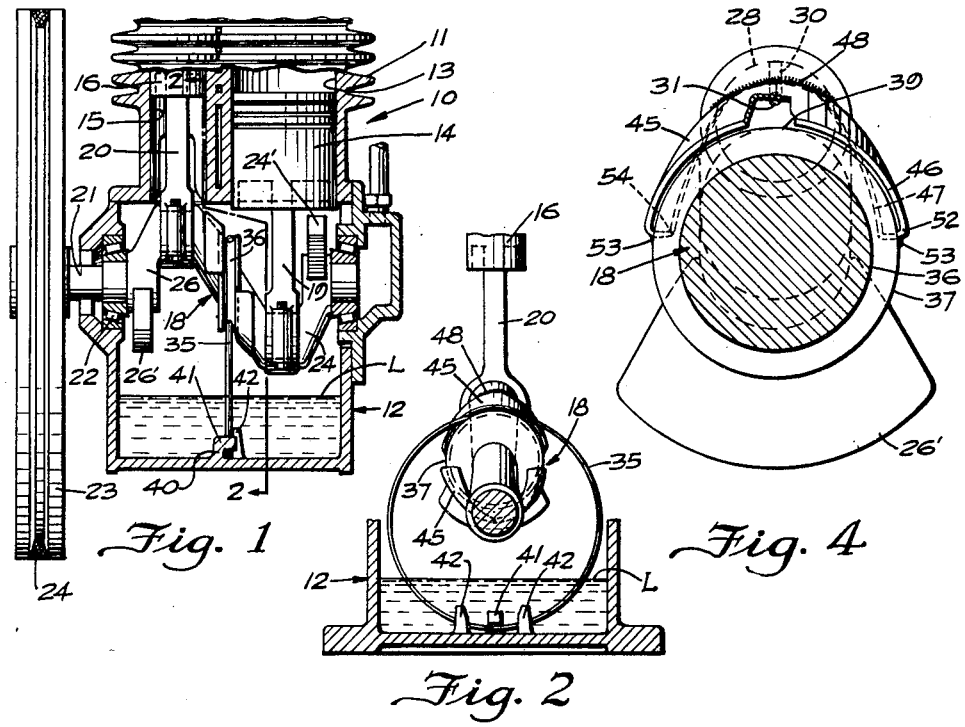
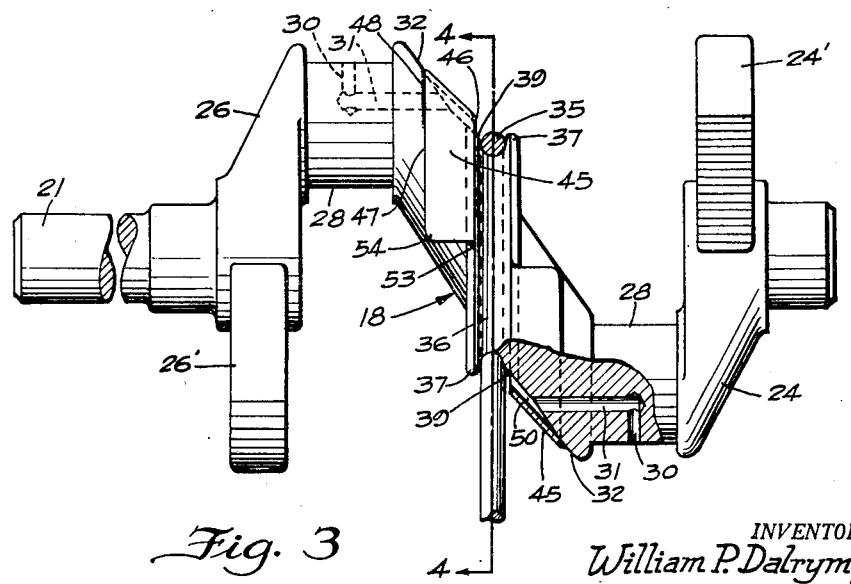
INVENTOR.
William P. Dalrymple
BY
Wallace and Cannon
ATTORNEYS March 27, 1951 — W. P. DALRYMPLE — 2,546,887
LUBRICATING SYSTEM
Filed Jan. 19, 1946 — 2 Sheets-Sheet 2

INVENTOR.
William P. Dalrymple
BY Wallace and Cannon
Attorneys

Patented Mar. 27, 1951

2,546,887

UNITED STATES PATENT OFFICE 2,546,887

LUBRICATING SYSTEM

William P. Dalrymple, Rochester, N. Y., assignor to American Brake Shoe Company, Wilmington, Del., a corporation of Delaware Application January 19, 1946, Serial No. 642,250

5 Claims. (Cl. 184—11)

This application is a continuation in part of my co-pending application, Serial No. 544,235, filed July 10, 1944, now abandoned.

This invention relates to lubricating systems and particularly to lubricating systems for supplying lubricant to the bearing surfaces of piston rods that are used to associate the pistons and the crank shaft of piston and cylinder devices such as pumps, engines, compressors and the like.

In various kinds of piston and cylinder devices such as pumps, compressors, engines and the like, the problem of affording sufficient and effective lubrication for the bearings of the piston rods has been quite difficult of solution, and many attempts have been made to provide for either a splash type of lubrication or a forced feed lubrication of such bearing surfaces in piston and cylinder devices of this character. Most of the prior lubricating systems utilized in such piston and cylinder devices have, however, been considered to be objectionable either by reason of high cost of manufacture and upkeep or by reason of unreliability of the lubrication attained by such lubricating means.

In view of the foregoing it is an important object of this invention to enable lubrication of the piston rods in such piston and cylinder devices to be attained through the use of simple and inexpensive structure that is reliable in operation, and an object related to the foregoing is to enable such lubrication to be attained through the use of means which does not require expensive machining operations.

In one prior attempt to afford lubrication for the piston rod bearings of a piston and cylinder device of the aforesaid character, a pulley-like oil collecting member has been provided on the crank shaft and rotatable oil transmitting means having the lower edge portion thereof disposed so as to run in the body of oil contained within the crank case has been associated with the pulley-like oil collecting member. In such prior arrangement, the rotation of the crank shaft serves to impart related rotative movement to the oil transmitting means, with the result that oil is carried by the transmitting means into the groove of the pulley like collecting member on the crank shaft, and means have been provided on the crank shaft for leading lubricant from oil collecting groove and into the lubricating passages that are provided for the piston rod bearings. In such prior devices, the structure employed for collecting the oil and conducting the same to the bearings has been relatively complicated and expensive to manufacture, and moreover, the collecting action of such structure has been relatively inefficient, with the result that proper and sufficient lubrication has not been attained in all instances. In view of the foregoing it is a further object of this invention to simplify the oil collecting structure in lubricating devices of this character, and a related object is to render such collecting structure more efficient and reliable in its operation so as to thereby insure proper lubrication of the bearings with which it is associated.

The oil transmitting means in such prior devices has in many cases taken the form of a ring suspended in and positioned by the oil collecting groove on the crank shaft, and such oil transmitting rings have been guided at the lower edge thereof so as to insure that the ring will remain in its proper relation in the supporting and guiding groove of the crank shaft upon which it is mounted. Such guiding structure at the lower edge of the lubricating ring has in the past been quite complicated and expensive to manufacture, and it is, therefore, a further object of this invention to enable a lubricating or oil transmitting ring of the aforesaid character to be guided at its lower edge by means that are simple and inexpensive in character and that are effective in a reliable manner to maintain the ring in its proper relationship upon the guiding groove of the crank shaft.

In lubricating apparatus of the aforesaid character, the relatively rapid rotative movement of the transmitting ring tends of course to discharge the lubricant from the surfaces of the ring so that where the pump or other device with which the transmitting ring is being used is being operated at high speed, the amount of oil that is transmitted to the bearings may in some instances become relatively small. In view of the foregoing, it is a further object of the present invention to enable this objectionable effect of centrifugal force to be eliminated in lubricating apparatus of the aforesaid character, and a further and related object is to utilize the action of centrifugal force to retain the lubricant on the transmitting ring during the rotative movement thereof thereby to insure that the lubricant will be transmitted efficiently to the bearings of the machine. A further and more specific object is to carry oil from the bottom of the crank case to the crank shaft within an internal annular groove formed in the transmitting ring, and to so relate the transmitting ring to the crank shaft that the oil that is thus transmitted will be positively discharged from the internal groove onto the crank shaft as an incident to the rotation of the crank shaft.

Other and further objects of the present invention will be apparent from the following description and claims and are illustrated in the accompanying drawings which, by way of illustration, show preferred embodiment, and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a fragmental vertical sectional view through a compressor having lubricating means embodying the features of the invention;

Fig. 2 is a fragmental vertical sectional view taken substantially along the line 2—2 of Fig. 1;

Fig. 3 is an enlarged elevational view of the crank shaft shown in Fig. 1, portions of the crank shaft being shown in section to further illustrate the details of the lubricating system;

Fig. 4 is a vertical sectional view taken substantially along the line 4—4 in Fig. 3;

Figure 5:
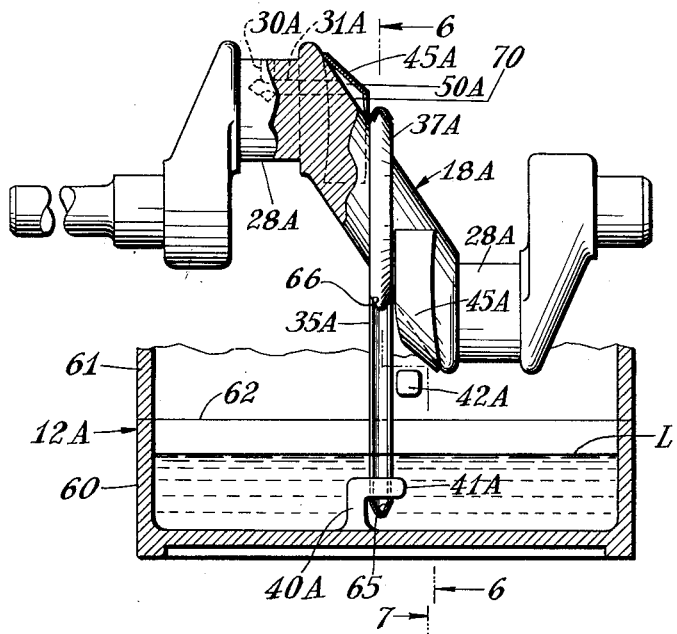
Fig. 5 is a fragmental view similar to Fig. 1 and illustrating an alternative embodiment of the invention.

For purpose of disclosure the invention is herein illustrated in Figs. 1 to 4 as embodied in a compressor 10 having a cylinder block 11 mounted upon a crank case 12. The compressor 10 as herein shown is of the two-stage type and has its first stage provided by a cylinder 13 formed in the cylinder block 11 and having a piston 14 mounted for reciprocation therein, while the second and final stage of the compression in the compressor 10 is afforded by a cylinder 15 formed in the cylinder block 11 and having a piston 16 mounted for reciprocation therein. The two pistons 14 and 16 are adapted to be reciprocated through operative connection thereof with a driven crank shaft 18 mounted in the end walls of the crank case, the desired operative connection being afforded by piston rods 19 and 20 connected respectively to the pistons 14 and 16. The crank shaft 18 is in the present instance driven by power means located externally of the crank case 12, and for this purpose one end 21 of the crank shaft is extended through a bearing 22 and through the end wall of the crank case and has a driving pulley 23 thereon to which a belted connection including a belt 24 may be extended.

The crank shaft 18, of course, is arranged with two cranks 24 and 26 counterbalanced by counterweights 24' and 26', and the cranks 24 and 26 are arranged for association respectively with the piston rods 19 and 20. Each of the two cranks is formed by sloping crank arms and a reduced crank pin affording a cylindrical bearing portion 28 adapted to be embraced by the appropriate bearing of the piston rod that is to be associated therewith, and it is the bearing surfaces 28 of the crank shaft that are lubricated by the lubricating system of the present invention. In attaining such lubrication of the bearing surfaces 28 of the crank shaft, means are provided for conducting lubricant from the body L thereof in the crank case 12 to the crank shaft 18 and thence to the bearing surfaces 28. Thus, each bearing surface 28 has at least one lubricating passage 30 extended radially inwardly therefrom and such radial passage 30 is arranged to intersect with a lubricating passage 31 that is extended in a generally longitudinal direction into the crank shaft from the angular surface 32 of one arm of the crank upon which the bearing surface 28 is formed. The means for conducting the lubricant from the body L to the crank shaft may take different forms, and with respect to some aspects of the present invention, the particular form of such oil transmitting means is immaterial. Thus, as herein shown the oil transmitting means includes a transmitting ring 35 that is preferably of circular cross section as shown in Fig. 3 of the drawings. This transmitting ring 35 is arranged to ride in its upper portion in an oil receiving groove 36 that is formed on the crank shaft 18 substantially midway between the two bearing surfaces 28 and concentric with the rotative axis of the crankshaft. The groove 36 is somewhat in the nature of a pulley groove in that it is afforded by two annular ribs 37 that serve in effect to form a grooved pulley, and as will be evident in Figs. 1 and 3, the angular disposition of the surfaces 32 of the adjacent arms of the two cranks causes the outer edge surface of each rib 37 to merge with one of the surfaces 32, as at 39 in Fig. 3. The points 39 are, of course, located at diametrically opposite points on the respective ribs 37, and such points 39 are in each instance located relatively close to the open ends of the lubricating passages 31.

The lower portion of the transmitting ring 35 is arranged to extend downwardly into the body L of oil or lubricant, and this lower edge portion of the transmitting ring 35 is engaged with guiding means that prevent undesired displacement of the transmitting ring 35 while permitting rotation of the ring as an incident to the rotation of the crank shaft 18. In accordance with the present invention such guiding means are of a simple character such that no machining operations are required thereon, and such means are also arranged so that the association of the transmitting ring 35 therewith may be accomplished in a simple and quickly performed operation. Thus, as shown in Figs. 1 and 2 of the drawings, an upstanding retaining lug 40 is cast integrally with the bottom wall of the crank case 12, such retaining lug 40 having a horizontally extended head 41 disposed so as to extend in a direction parallel to the rotative axis of the crank shaft 18. The lug 40 is so disposed that when the transmitting ring 35 is positioned so as to ride in the groove 36, the lower edge portion of the ring 35 will be disposed in a position beneath the projecting head 41 of the lug 40. When the oil transmitting ring 35 is thus disposed with its lower portion beneath the head 41, it is held in this position by a pair of upstanding positioning lugs 42 that are formed by casting on the lower wall of the crank case 12. The positioning lugs 42 are so spaced from the lug 41 as to engage the side surfaces of the ring 35 on the side opposite from point of engagement of the lug 40 therewith, and thus the transmitting ring is held against displacement from its position beneath the head 41. The spacing of the positioning lugs 42 from the lug 41 is such that when the ring is tipped to the left in Fig. 1, the lower edge portion of the ring will be moved beyond the end of the head 41 so as to release the ring from the guiding or restraining influence of the lugs 40 and 42. Thus the ring 35 may readily be placed in the desired operative association with respect to the lugs 40 and 42, this being accomplished prior to the time when the ring 35 is associated with the groove 36 on the crank shaft 18. The lugs 40 and 42 may, of course, be cast integrally with the bottom wall of the crank case 12, and no finishing operations are required thereon. As a result, the provision of the lugs may be economically accomplished, and the mounting operations required to associate the ring therewith are relatively simple.

When the ring 35 is caused to rotate due to rotation of the crank shaft 18 the oil from the body L thereof will tend to cling to the ring 35 and will be carried upwardly so as to be deposited upon or within the groove 36. Part of the oil that is thus transmitted to the groove 36 will, of course, tend to move outwardly along the side surfaces of the groove due to the action of centrifugal force thereon, but the same force will cause part of the remainder to be thrown outwardly into space from the surfaces of the groove, ring, and crank arm. In accordance with the present invention, means are associated with the crank shaft 18 for collecting such oil and transmitting the same under an appreciable pressure to the lubricating passages 31. The oil collecting means that are provided in accordance with the present invention are simple in character so that the manufacturing cost thereof is maintained at a minimum. Thus, as shown in Figs. 2 and 4, an oil collecting plate 45 is associated with each of the cranks 24 and 26, such oil collecting plates 45 being so disposed as to overlie the exposed ends of the lubricating passages 31. The oil collecting plates 45 are generally arcuate in form, and are so arranged that one edge 46 thereof overlies the outer edge of the adjacent rib 37 for a substantial arcuate distance in a radially outwardly spaced relation to the outer edge of the rib. The opposite edge 47 of each oil collecting plate 45 is arranged so as to abut the surface of the arm of the crank upon which it is mounted adjacent to the sloping surface 32, and the edge 47, for a substantial arcuate distance about the arm upon which it is mounted, is fixed to the surface of the arm by means such as welding indicated at 48 in the drawings. The portion of each oil collecting plate 45 that is adjacent to the open end of the lubricating passage 31 is arranged so as to slope toward the axis of the crank shaft at a relatively steep angle and the arrangement is such that the space between the plate 45 and the adjacent surface 32 of the arm of the crank upon which the plate is mounted gradually increases, thereby to form an oil collecting chamber 50 disposed opposite the open end of the lubricating passage 31 as shown in Figs. 3 and 4. Thus the oil that is caused to flow outwardly along the side surfaces of the groove 36 may move along surface 32 of the crank and into the chamber 50 and at least a portion of the oil discharged from the surfaces of the groove, ring and crank arm will also be collected in the chamber 50. Since this chamber is defined at this point by the edge surface 46 of the plate 45 and by the arcuate extent of the welded joint 48, such lubricant is effectually confined in the chamber 50 and is maintained in the chamber 50 by the action of centrifugal force. The rotation of the crank shaft causes the oil that is thus confined or collected in the chamber 50 to be placed under pressure that tends to force such collected oil through the passages 31 and 30 and onto the bearing surface 28 of the crank. This serves to lubricate this bearing surface and the bearing surface of the piston rod that is associated therewith.

It will be observed that the oil collecting plate 45 may be readily formed from sheet metal and may readily be secured in position on one of the cranks of the crank shaft. While the welded joint 48 that is afforded along the line of engagement of the edge 47 of the plate with the arm of the crank is in most instances sufficient to maintain the plate 45 rigidly in position on the crank shaft, the end edges of the plate 45 may be bent inwardly as at 52 so as to engage the edge of the adjacent rib 37, and the end flanges 52 may be welded to the adjacent rib 37 as indicated at 53 in Figs. 3 and 4. The edge 46 of each plate 45 extends in spaced but aligned relationship with respect to the edge of the adjacent rib 37 for a considerable arcuate distance, and hence oil may under some circumstances be discharged from the adjacent surfaces of the groove onto the inner surfaces of the plate along the entire extent of the edge 46, and where oil is thus discharged onto the inner surface of the plate 45, such oil is at least in part directed into the chamber 50 by the action of centrifugal force that causes such oil to be moved in a generally radial direction toward and along the inner face of the plate into such collecting chamber 50. This action is promoted by so forming the plates 45 that the corners 54 thereof, Figs. 3 and 4, are bent inwardly so as to lie closer to the axis of rotation of the crank shaft than to the corresponding corners where the welded joints 53 are formed. Thus the shape of the inner surface of the collecting plate is such that centrifugal force will direct oil along the inner surface thereof toward and into the pressure chamber 50.

Figure 6:
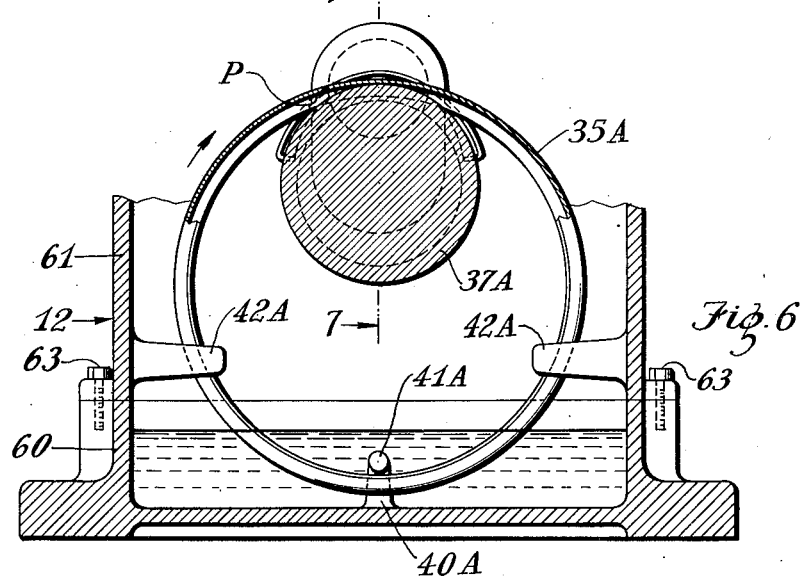
Fig. 6 is a fragmental sectional view taken along the line 6—6 of Fig. 5.
Figure 7:
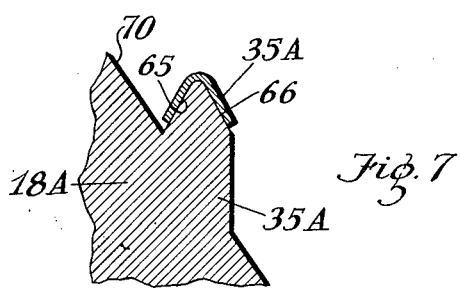
Fig. 7 is an enlarged fragmental portion of Fig. 5.

In the form of the invention that is illustrated in Figs. 5 to 7 of the drawings, the invention is fragmentally illustrated as embodied in a pump or compressor of the general character shown in Fig. 1. This apparatus has a sectional crank case 12A, the bottom portion or section 60 of which is adapted to contain a supply of lubricant up to a level L. The crank case 12A has an upper section 61 that rests on the lower section 60 along a line 62 and the upper section 61 may be secured in position on the lower section 60 by means such as cap screws 63 as shown in Fig. 6. The crank case 12A has a crank shaft 18A mounted therein, in any preferred manner, as for example, in the manner shown in Fig. 1, and this crank shaft has bearings 28A with associated oil transmitting passages 30A and 31A arranged in the same manner as in the previously described embodiments of the invention. Furthermore, a collecting chamber 50A is provided in respect to each of these bearings 28A by a plate 45A that corresponds in form, function and mounting with the plates 45 with the other embodiment of the invention.

In this embodiment of the invention, however, the form of the oil transmitting means is substantially different, as will be evident in the drawings, and an oil transmitting ring 35A of annular form is associated with the crank 18A so as to be rotated in the course of rotation of the crank shaft, the lower edge of the transmitting ring 35A being arranged so as to be disposed in the body of oil contained in the lower section 60 crank case. The transmitting ring 35A is, of course, annular in character, and is so formed in cross section as to afford an internal annular groove 65. In the present instance the internal annular groove is afforded by forming the transmitting ring 35A from sheet metal, but it will be obvious that such an internal groove might be formed in other ways. The groove 65 is in the present instance generally V-shaped in cross sectional form, and at its upper edge the transmitting ring 35A is arranged to rest upon the upper edge of a disc 37A. The disc 37A has its outer edge formed so as to be generally V-shaped in cross section, this V-shaped form being indicated at 66 and being substantially complemental to the form of the groove 65. The disc 37A is concentric with the rotative axis of the crank shaft 18A, and in the course of the rotation of the crank shaft, the disc 37A serves to impart rotative movement to the transmitting ring 35A.

The transmitting ring 35A is held in position near its lower portions by a lug arrangement that is fundamentally the same as the lug arrangement illustrated in the previously described embodiment of the invention. Thus a lug 40A extends upwardly from the bottom wall of the section 60, and a horizontal arm 41A extends in such a position as to project through the transmitting ring 35A near the lower end thereof. Thus the portion 40A holds the lower portion of the ring against movement to the left in Fig. 5, and the lower portion of the ring is held in position beneath the lug 41A by lugs 42A that extend inwardly, as shown in Fig. 6, from the side walls of the section 61 of the crank case. The lugs 42A are disposed on the side of the ring 35A that is opposite from the lug portion 40A, so that the lugs 42A serve to hold the ring in proper cooperation with respect to the lug portion 41A.

It will be obvious that when oil flows into the groove 65 in the lower portion of the ring 35A, the rotative movement of the ring 35A will tend to maintain this oil in the groove 65, so that such oil will be transmitted or carried upwardly as the rotation of the ring 35A progresses. When the oil reaches the zone indicated by the reference character P in Fig. 6, the space between the ring 35A and the disc 37A will be gradually decreased thereby to force the oil out of the space within the groove 65 and onto the adjacent surfaces of the crankshaft. Thus where oil is forced on to a surface 70 of the crankshaft, Figs. 5 and 7, that is opposite the open end of the oil collecting chamber 50A, such oil will at once be thrown outwardly into the collecting chamber 50A thereby to accomplish the desired lubrication in the manner heretofore described with respect to the other embodiment of the invention.

From the foregoing it will be evident that the present invention enables lubrication of piston and cylinder devices such as pumps, engines, compressors and the like, to be attained by apparatus of a simple and inexpensive character, and it will also be evident that in accordance with the present invention, a transmitting ring may be utilized in lubricating apparatus of the aforesaid character in such a manner that the mounting and guiding of the ring in the apparatus may be readily and economically effected.

While I have illustrated and described a selected embodiment of my invention, it is to be understood that this is capable of variation and modification and I therefore do not wish to be limited to the precise details set forth but desire to avail myself of such changes and alterations as fall within the purview of the following claims.

I claim:

1. In a piston and cylinder device, a crank case and a cylinder block mounted in operative association, said cylinder block having at least one cylinder formed therein, a crank shaft mounted in said crank case, a piston mounted in said cylinder, means including a piston rod operatively connecting said piston and said crank shaft in power transmitting relationship, a pulley-like oil receiving groove formed on said crank shaft concentric to the rotative axis thereof, a transmitting ring riding in said groove and depending therefrom toward the bottom of the crank case, a sheet metal member mounted on said crank shaft with one edge overlying the adjacent edge of the said groove and in radially spaced relation to such groove, the other edge of said plate being secured to outer faces of said crank shaft to form a collecting chamber, means affording oil passages from said chamber to the associated bearing surfaces of said crank shaft and said piston rods, and means in the lower portion of said crank case for guiding the lower portion of said ring, said guiding means comprising an upstanding lug having a head extended laterally and through said ring, and a pair of positioning lugs disposed on the opposite side of said ring and operable to maintain said ring in position beneath the head of said first mentioned lug.

2. In a piston and cylinder device, a crank case, a crank shaft mounted in said crank case, a cylinder block associated with said crank case and having a cylinder formed therein, a piston mounted for reciprocation in said cylinder, a piston rod operatively connecting said crank shaft and said piston, said crank shaft and said piston rod having opposed bearing surfaces, and said crank shaft having lubricating passages arranged to discharge onto such bearing surfaces, means operatively associated with said passages for discharging lubricant into said passages, means for collecting lubricant and transmitting the same to said lubricant discharge means, said last mentioned means comprising a pulley-like structure formed on said crank shaft concentric with the axis of rotation thereof, a ring riding on said pulley-like structure and depending downwardly therefrom into the lower portion of said crank case, and means in the lower portion of said crank case for guiding the lower portion of said ring, said guiding means comprising an upstanding lug formed integrally with said crank case and having a head extended laterally and through said ring, and a pair of positioning lugs formed integrally with said crank case and disposed on the opposite side of said ring and operable to maintain said ring in position beneath the head of said first mentioned lug.

3. In a piston and cylinder device, a crank case and a cylinder block mounted in operative association, said cylinder block having at least one cylinder formed therein, a crank shaft mounted in said crank case, a piston mounted in said cylinder, means including a piston rod operatively connecting said piston and said crank shaft in power transmitting relationship, a disc formed on said crank shaft concentric to the rotative axis thereof and having a peripheral surface of an outwardly convex cross sectional form, a transmitting ring riding on said convex surface of said disc and having an internal annular surface of a cross sectional form substantially complemental to said convex surface, and said ring depending from said disc toward the bottom of the crank case, means for guiding a portion of said transmitting ring to retain said ring on said disc, means rigid with said crank shaft and affording an oil collecting chamber with an inlet opening disposed adjacent to one edge of said disc, and means affording oil passages from said chamber to the associated bearing surfaces of said crank shaft and said piston rod.

4. In a piston and cylinder device, a crank case and a cylinder block mounted in operative association, said cylinder block having at least one cylinder formed therein, a crank shaft mounted in said crank case, a piston mounted in said cylinder, means including a piston rod operatively connecting said piston and said crank shaft in power transmitting relationship, a disc formed on said crank shaft concentric to the rotative axis thereof and having a peripheral surface of an outwardly convex cross sectional form, a transmitting ring riding on said convex surface of said disc and formed from sheet metal to afford an internal annular surface of a cross sectional form substantially complemental to said convex surface, and said ring depending from said disc toward the bottom of the crank case, means for guiding a portion of said transmitting ring to retain said ring on said disc, means rigid with said crank shaft and affording an oil collecting chamber with an inlet opening disposed adjacent to one edge of said disc, and means affording oil passages from said chamber to the associated bearing surfaces of said crank shaft and said piston rod.

5. In a piston and cylinder device, a crank case and a cylinder block mounted in operative association, said cylinder block having at least one cylinder formed therein, a crank shaft mounted in said crank case, a piston mounted in said cylinder, means including a piston rod operatively connecting said piston and said crank shaft in power transmitting relationship, a pulley-like structure formed on said crank shaft concentric to the rotative axis thereof, a transmitting ring riding on said pulley-like structure and depending therefrom toward the bottom of the crank case, means affording oil passages having inlets and extended to the associated bearing surfaces of said crank shaft and said piston rods, and means in the lower portion of said crank case for guiding the lower portion of said ring, said guiding means comprising an upstanding lug having a head extended laterally and through said ring, and a pair of positioning lugs disposed on the opposite side of said ring and operable to maintain said ring in position beneath the head of said first mentioned lug.

WILLIAM P. DALRYMPLE.

REFERENCES CITED

The following references are of record in the file of this patent:

UNITED STATES PATENTS

| Number | Name | Date |
| --- | --- | --- |
| 1,647,846 | Vincent | Jan. 1, 1927 |
| 1,847,418 | Steedman | Mar. 1, 1932 |
| 1,869,362 | Ackerman | Aug. 2, 1932 |
| 2,280,296 | Mantle | Apr. 21, 1942 |